United States Patent
Yuan et al.

(10) Patent No.: US 9,621,859 B2
(45) Date of Patent: Apr. 11, 2017

(54) TIME-LAPSE PHOTOGRAPHY METHOD, ITS COMPUTER PROGRAM PRODUCT, AND ELECTRONIC DEVICE WITH IMAGE-CAPTURING FUNCTION THEREOF

(71) Applicant: CHICONY ELECTRONICS CO., LTD., New Taipei (TW)

(72) Inventors: Shang-Yuan Yuan, New Taipei (TW); Hsiang-Ping Liu, New Taipei (TW); Mei-Yi Tsai, New Taipei (TW); Wei-Cheng Huang, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 14/603,295

(22) Filed: Jan. 22, 2015

(65) Prior Publication Data
US 2015/0271455 A1    Sep. 24, 2015

(30) Foreign Application Priority Data
Mar. 24, 2014   (TW) .............................. 103110900 A

(51) Int. Cl.
*H04N 7/18*   (2006.01)
*H04N 5/77*   (2006.01)
*G06K 9/00*   (2006.01)

(52) U.S. Cl.
CPC ............ *H04N 7/188* (2013.01); *H04N 5/772* (2013.01)

(58) Field of Classification Search
CPC ..... H04N 5/722; H04N 7/188; G06K 9/11221
USPC ...... 348/222.1, 207.99, 208.14, 231.99, 169; 382/218, 254, 275; 396/48
See application file for complete search history.

(56) References Cited

U.S. PATENT DOCUMENTS

| 8,515,270 | B1 | 8/2013 | Posehn | |
| 9,277,123 | B2* | 3/2016 | Williams | H04N 5/23245 |
| 2006/0031216 | A1 | 2/2006 | Semple et al. | |
| 2009/0079850 | A1* | 3/2009 | Okamoto | G02B 21/367 348/231.99 |
| 2013/0089262 | A1 | 4/2013 | Chen et al. | |
| 2013/0121525 | A1* | 5/2013 | Chen | G06T 3/0062 382/100 |
| 2014/0036233 | A1* | 2/2014 | Posehn | G03B 15/00 352/44 |

(Continued)

FOREIGN PATENT DOCUMENTS

| EP | 2 178 274 A1 | 4/2010 |
| TW | I321957 B | 3/2010 |

OTHER PUBLICATIONS

Office Action for corresponding Taiwanese Application No. 103110900, 7 pp., (Apr. 27, 2016).

*Primary Examiner* — Tuan Ho
*Assistant Examiner* — Marly Camargo
(74) *Attorney, Agent, or Firm* — Blakely, Sokoloff, Taylor & Zafman LLP

(57) ABSTRACT

A time-lapse photography method includes several steps as follows. A determination is immediately made as to whether an image retaining condition is satisfied whenever an electronic device with an image-capturing function collects at least one data set. The data set includes a captured image. When the image retaining condition is satisfied, the captured image of the data set is stored; otherwise, the captured image of the data set is refused to be stored.

7 Claims, 9 Drawing Sheets

(56) References Cited

U.S. PATENT DOCUMENTS

2014/0105564 A1* 4/2014 Johar ............... H04N 5/915
                                                386/226
2015/0215537 A1* 7/2015 Nishizaka .......... H04N 5/23245
                                                348/220.1

* cited by examiner

TIME-LAPSE PHOTOGRAPHY METHOD, ITS COMPUTER PROGRAM PRODUCT, AND ELECTRONIC DEVICE WITH IMAGE-CAPTURING FUNCTION THEREOF

RELATED APPLICATIONS

This application claims priority to Taiwanese Application Serial Number 103110900, filed Mar. 24, 2014, which is herein incorporated by reference.

BACKGROUND

Field of Invention

The present invention relates to an electronic device with an image-capturing function and a time-lapse photography method thereof.

Description of Related Art

Interval timer shooting, also known as time-lapse photography, is a photography technology in which the picture photography frequency is set to be less than the frequency generally required for viewing continuous pictures. For example, images are photographed at intervals through an image capture device, and the image data captured are then broadcast after postproduction by software.

Owing to the rise of wearable photographing devices, users are able to record the images seen for an extended time by utilizing the photographing devices carried with them and the time-lapse photography. However, when the image capture device is utilized to perform time-lapse photography for an extended time (such as one day or one week), not only is sufficient power required to operate, but sufficient storage space is also required to store the huge amount of image data thus generated. In addition, the image information generated by extended recording is too excessive and not screened, most of it thus having no conservation value. For example, if the user wishes to record a single day in the life of the user by utilizing the time-lapse photography, and however, the user may be in the same environment for several hours (such as three hours) in one day, there will be a lot of repetition of image data even though the total quantities of contents of image data have been reduced through the time-lapse photography. As a result, the user needs to spend a lot of time searching and screening meaningful image data from the huge amount of image data as generated, which is quite inefficient.

For the forgoing reasons, there is a need to solve the above-mentioned inconveniences and shortcomings by providing a time-lapse photography method, a computer program product thereof, and an electronic device with an image-capturing function thereof, which is also an objective that the relevant industry is eager to achieve.

SUMMARY

It is an objective of the present invention to provide an electronic device with an image-capturing function and a time-lapse photography method to solve the inconveniences and shortcomings of the prior art. That is, a determination is made as to whether the captured image captured by the electronic device needs to be retained, by determining whether the data set collected by the electronic device allows an image retaining condition to be satisfied, to decrease the number of captured images to be store. As a result, the storage space occupied is reduced to increase the efficiency of finding a specific target in the captured images.

A time-lapse photography method is provided. The time-lapse photography method comprises steps as follows. A determination is made as to whether an image retaining condition is satisfied whenever an electronic device with an image-capturing function collects at least one data set. The data set at least comprises a captured image. When the image retaining condition is satisfied, store the captured image of the data set. When the image retaining condition is not satisfied, refuse to store the captured image of the data set. A computer program product stores a computer program. When the computer program is loaded through the electronic device with the image-capturing function, the computer program enables the electronic device to perform the above time-lapse photography method.

The invention provides an electronic device with an image-capturing function. The electronic device comprises a memory, an image capture module, and a processor. The image capture module captures a plurality of captured images and sequentially transmits the captured images to the memory. The processor is electrically connected to the image capture module and the memory. The processor immediately determines whether an image retaining condition is satisfied whenever the image capture module captures at least one of the captured images. When the processor determines that the image retaining condition is satisfied, store the at least one of the captured images. Otherwise, when the processor determines that the image retaining condition is not satisfied, at least refuse to store the at least one of the captured image.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

As used herein, "around," "about", or "approximately" shah generally mean within 20 percent, preferably within 10 percent, and more preferably within 5 percent of a given value or range. Numerical quantities given herein are approximate, meaning that the term "around," "about", or "approximately" can be inferred if not expressly stated.

According to the present invention time-lapse photography method, an electronic device with an image-capturing function is utilized to determine whether a data collected (comprises a parameter data or/and a captured image) allows an image retaining condition to be satisfied so as to determine whether to retain the captured images captured at different times. A type of the present invention electronic device with the image-capturing function is not limited. The present invention electronic device with the image-capturing function is, for example, a photographing device, a mobile phone, a tablet personal computer, or a portable device. In the following, the photographing device is taken as an example, however, other electronic device with an image-capturing function may be adopted.

The present invention time-lapse photography method can be realized in a computer program (comprises software or firmware) product. The computer program product stores a computer program. When the computer program is loaded via an electronic device with an image-capturing function, the computer program enables the electronic device to perform the time-lapse photography method. The computer program product may be stored in a read only memory, a flash memory, a floppy disk drive, a hard disk drive, an optical disk drive, a USB HDD, a magnetic tape, a database accessible through a network, or a readable storage medium of an electronic device having the same function and easily conceived by those of ordinary skill in the art.

First Embodiment

Figure 1:
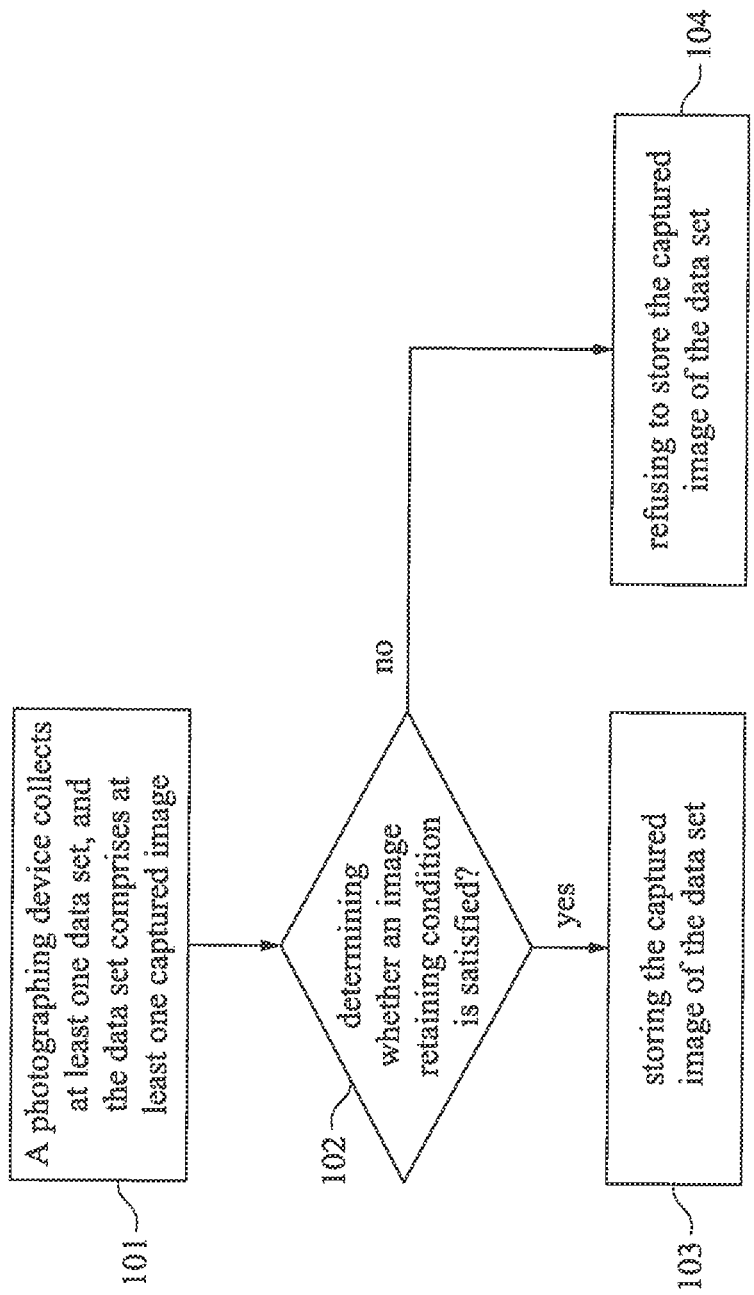
FIG. 1 depicts flowchart of a time-lapse photography method according to a first embodiment of this invention.

FIG. 1 depicts flowchart of a time-lapse photography method according to a first embodiment of this invention. As shown in FIG. 1, the time-lapse photography method comprises the following steps:

In step 101, a photographing device collects at least one data set. The data set comprises at least one captured image. If the data set has a plurality of captured images, the captured images represent a dynamic film photographed by the photographing device, and a capture frequency of the photographing device is 15 images/second.

In step 102, a determination is made as to whether an image retaining condition is satisfied whenever the photographing device collects the captured image of one data set. If yes, go to step 103; if not, go to step 104.

In step 103, store the captured image of the one data set.

In step 104, refuse to store the captured image of the one data set.

Hence, by setting the image retaining condition, whether to retain the captured image captured by the photographing device is determined so as to decrease a number of captured images that are stored. Not all of the captured images captured by the photographing device are stored, thus reducing the storage space occupied and also increasing the efficiency of finding a specific target in the captured images.

In the first embodiment, the image retaining condition is for determining whether at least part of contents of the captured image of the data set collected by the photographing device satisfy a preset comparison criterion. The preset comparison criterion is, for example, a preset brightness value or a preset face recognition criterion. For example, when a brightness of the captured image satisfies one preset comparison criterion, or when part of the contents of the captured image satisfy the face recognition criterion so that a person's face is identified, the image retaining condition is satisfied, Otherwise, the image retaining condition is not satisfied to refuse to store the captured image of the data set. To refuse to store the captured image comprises an option of deleting the captured image from a temporary memory or allowing the captured image not to be stored in a non-volatile memory. Therefore, images having a poor picture quality or not having conservation values are excluded by way of the image retaining condition according to the first embodiment.

However, the present invention is not limited to the above-mentioned preset comparison criterion. A type of the comparison criterion may be adjusted depending on users' requirements or restrictions.

Figure 2:
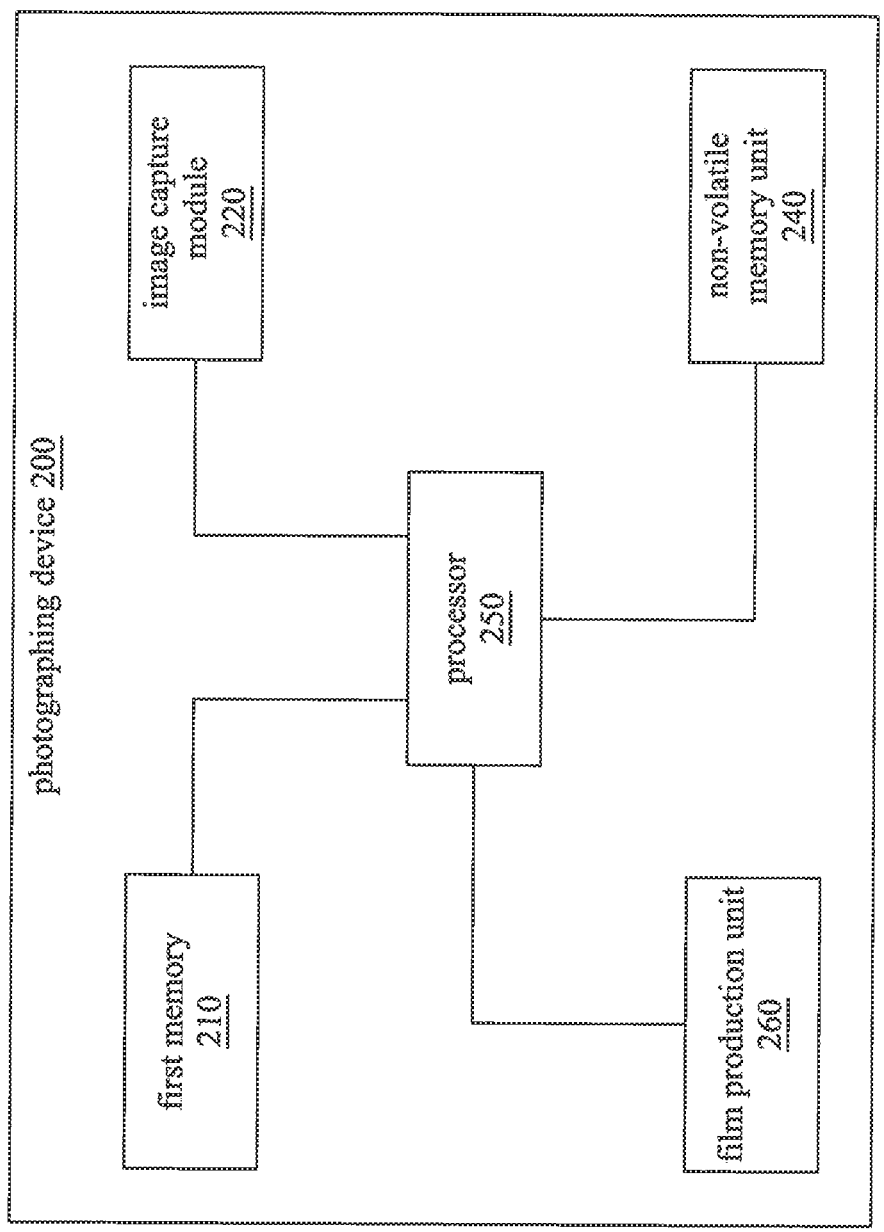
FIG. 2 depicts a functional block diagram of a photographing device according to the first embodiment of this invention.

FIG. 2 depicts a functional block diagram of a photographing device 200 according to the first embodiment of this invention. As shown in FIG. 2, the photographing device 200 comprises a first memory 210, an image capture module 220, a non-volatile memory unit 240, and a processor 250. The image capture module 220 captures a plurality of captured images sequentially according to a time axis and sequentially transmits the captured images to the first memory 210. The processor 250 is electrically connected to the first memory 210, the non-volatile memory unit 240, and the image capture module 220, and allows the first memory 210, the non-volatile memory unit 240, and the image capture module 220 to operate according to instructions. The first memory 210 is a temporary memory (such as a dynamic random access memory, DRAM) to allow the processor 250 to determine whether at least part of the contents of the captured image that is captured satisfy the preset comparison criterion according to the above embodiment. The non-volatile memory unit 240 is, for example, a flash memory, a floppy disk drive, a hard disk drive, an optical disk drive, a USB HDD, a magnetic tape, or a database accessible through a network, for storing the captured images satisfying the preset comparison criterion for an extended time.

However, except for serving as a temporary memory, the first memory may also store the captured images satisfying the preset comparison criterion for an extended time in other embodiments. For example, the first memory provides a storage address additionally for extended storage.

In the present embodiment, with additional reference to FIG. 2, the photographing device 200 further comprises a film production unit 260. The film production unit 260 is electrically connected to the processor 250. The film production unit 260 produces a single broadcast film with all the captured images stored in the non-volatile memory unit 240. For example, the captured images are connected in series to produce a single broadcast film so as to increase the efficiency of finding a specific target in the captured images.

Although the film production unit 260 is located in the photographing device 200 according to the present embodiment, however, the film production unit may be an independent device external from the photographing device in other embodiments. Or, the film production unit may be implemented in software or firmware.

Second Embodiment

Figure 3:
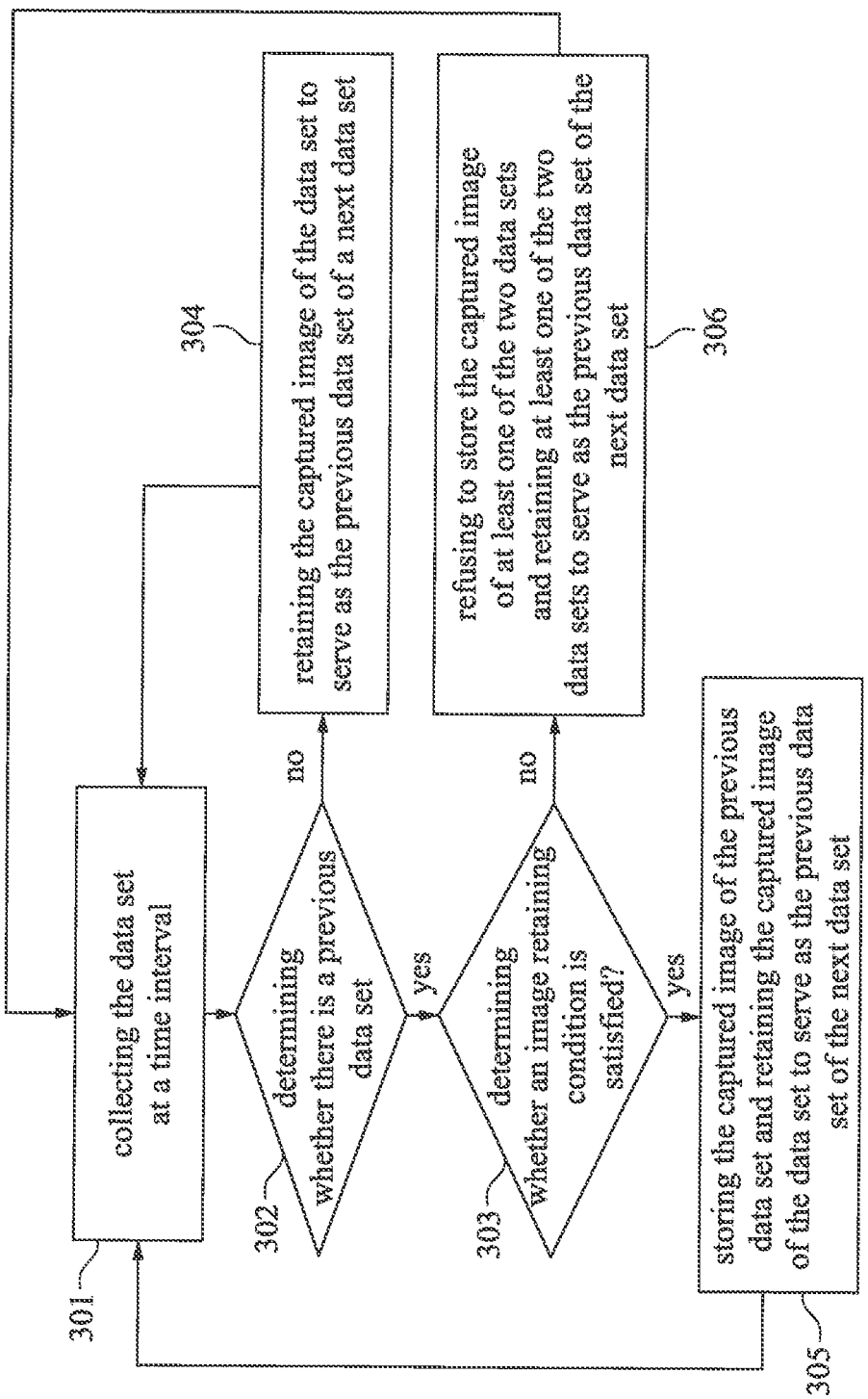
FIG. 3 depicts flowchart of a time-lapse photography method according to a second embodiment of this invention.

FIG. 3 depicts flowchart of a time-lapse photography method according to a second embodiment of this invention. As shown in FIG. 3, the time-lapse photography method according to the second embodiment comprises the following steps:

In step 301, a photographing device collects the data set as mentioned previously at a first time interval.

In step 302, determine whether there is a previous data set. If yes, go to step 303; if not, go to step 304.

In step 303, a determination is made as to whether an image retaining condition is satisfied whenever at least two continuous data sets are collected. If yes, go to step 305; if not, go to step 306. In the second embodiment, the image retaining condition is for determining whether a difference exits between the captured images of the continuous data sets collected.

In step 304, retain the captured image of the data set to serve as "the previous data set" of a next data set and return to step 301.

In step 305, store the captured image of the previous data set and retain the captured image of the data set to serve as "the previous data set" of the next data set and return to step 301.

In step 306, refuse to store the captured image of at least one of the two data sets and retain the captured image of at least one of the two data sets to serve as "the previous data set" of the next data set and return to step 301. To refuse to store the captured image comprises an option of deleting the captured image from the first memory 210 or allowing the captured image not to be stored in the non-volatile memory unit 240. Retaining at least one of the two data sets comprises retaining the captured image of a former data set, the captured image of a latter data set, or the captured images of both.

In greater detail, determining whether a difference exits between the captured images of the continuous data sets collected is to compare whether there is a complete difference or at least a substantial difference between a color of pixels located at a same position of the captured images, according to the present embodiment.

If it is determined that a difference exits between the captured images of the continuous data sets collected by the electronic device, the image retaining condition is satisfied, that is, to store the captured image of at least one of the two data sets. In the present embodiment, the captured image of the previous data set is stored. Otherwise, if it is determined that no difference exits between the captured images of the continuous data sets collected by the electronic device, the image retaining condition is not satisfied to refuse to store the captured image of at least one of the two data sets and retain at least one of the two data sets to serve as "the previous data set" of the next data set. The repetitive of image data is thus reduced. It should be understood that to store or refuse to store the captured image of at least one of the two data sets is storing or abandoning the captured image of the former data set, the captured image of the latter data set, or the captured images of both.

It should be understood that the present invention is not limited to the practice described in the above second embodiment. In other practice of step 305, the captured image of the latter data set in the two continuous data sets is stored. Or, the captured images of the two continuous data sets are stored simultaneously. Similarly, in other practice of step 306, refuse to store the captured image of the former data set is changed to refuse to store the captured image of the latter data set.

Figure 4:
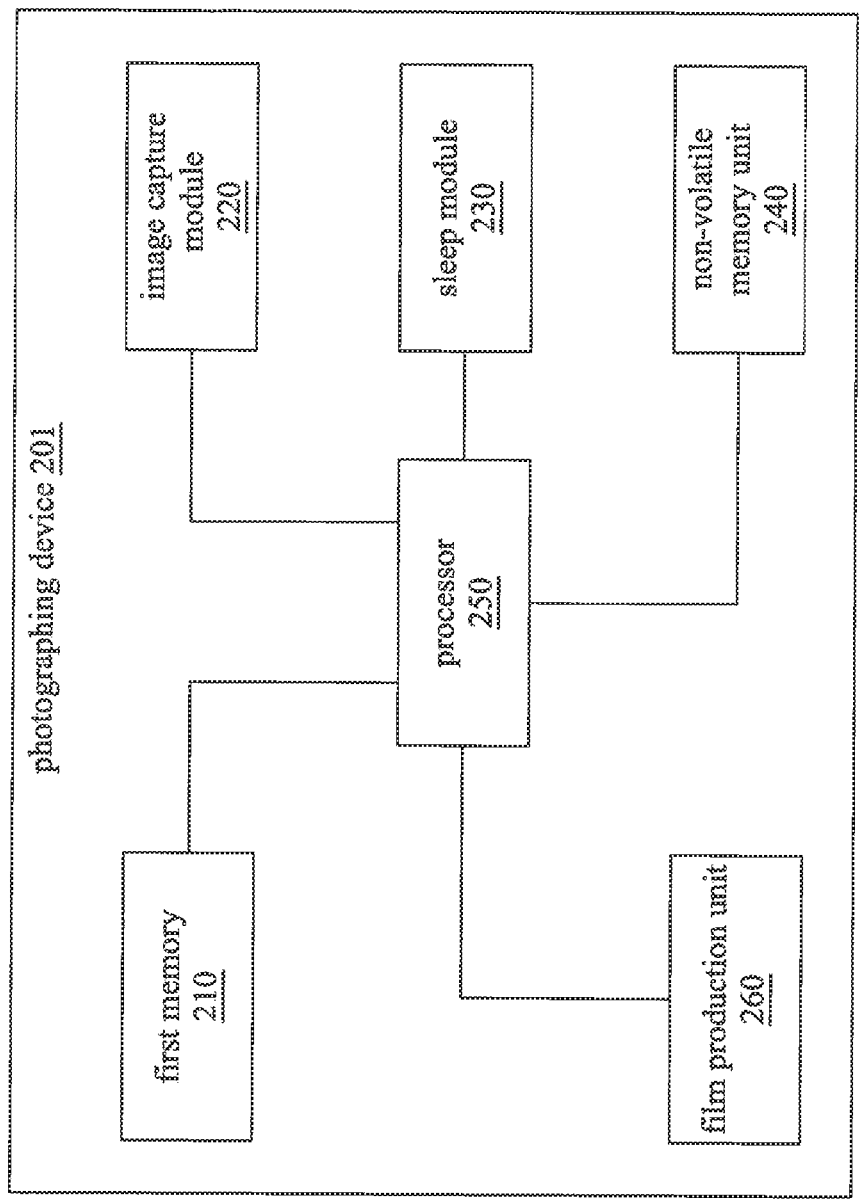
FIG. 4 depicts a functional block diagram of a photographing device according to the second embodiment of this invention.

FIG. 4 depicts a functional block diagram of a photographing device 201 according to the second embodiment of this invention. As shown in FIG. 4, the second embodiment and the first embodiment are about the same. One of the differences is that the photographing device 201 further comprises a sleep module 230. The sleep module 230 is electrically connected to the processor 250 to at least allow the image capture module 220 and the processor 250 to sleep. Thus, the image capture module 220 and the processor 250 operate intermittently.

In greater detail, the sleep module 230 allows the image capture module 220 and the processor 250 to sleep for a period of time (that is, a sleep time) at regular times according to setting. In other words, the sleep module 230 allows the image capture module 220 to capture the captured images of the data sets one by one at the first time intervals, and allows the processor 250 to determine whether the image retaining condition is satisfied at the first time intervals.

In addition, an amplitude of the above-mentioned first time interval is not limited. For example, the first time interval is longer than or equal to one second in principle. However, the first time interval is not limited to being fixed or variable according to the present invention.

According to the second embodiment, in greater detail, when the processor 250 determines that a difference exits between the captured images of the at least two continuous data sets in the first memory 210, the processor 250 allows the captured image of at least one of the at least two continuous data sets to be stored in the non-volatile memory unit 240. Or, the processor 250 does not process the captured image of a most previous data set in the at least two continuous data sets in the first memory 210 to allow the captured image to be overwritten by subsequent data. Or, the captured image even disappears after the first memory 210 is powered off. In addition, the processor 250 further retains the captured image of a last data set in the at least two continuous data sets in the first memory 210 to serve as "the previous data set" for being compared with the next data set.

Figure 5:
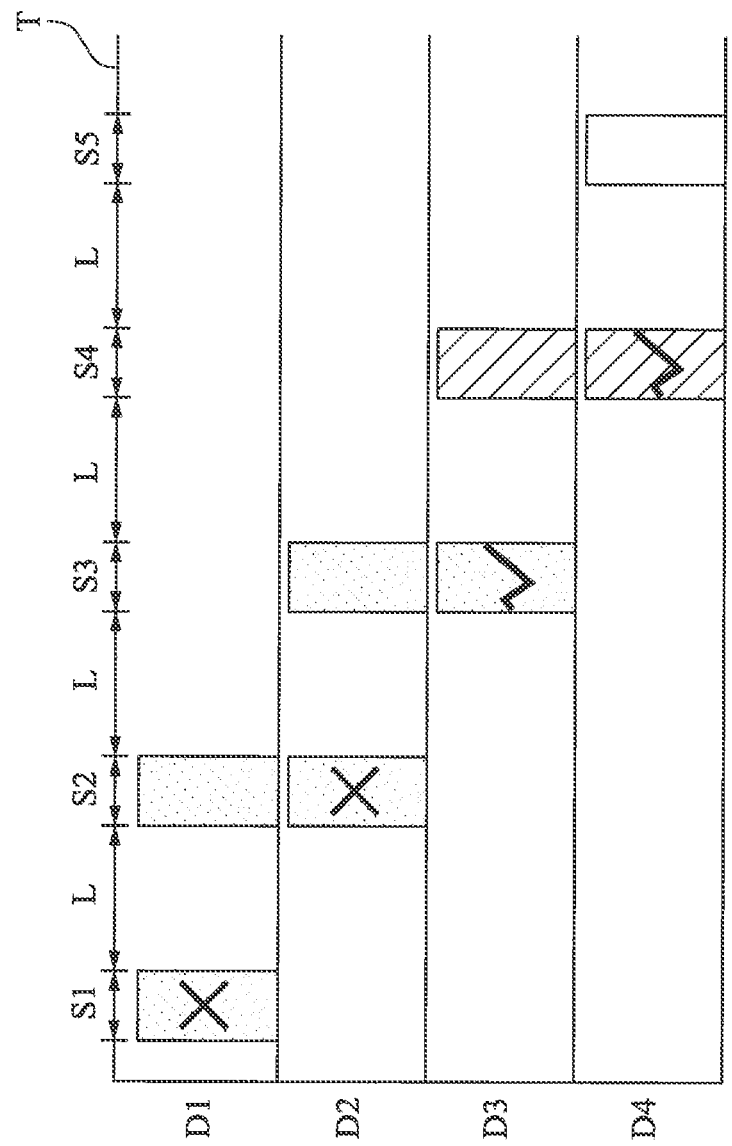
FIG. 5 depicts a time schematic diagram of determinations performed by a photographing device according to the second embodiment of this invention.

FIG. 5 depicts a time schematic diagram of determinations performed by the photographing device 201 according to the second embodiment of this invention. As shown in FIG. 4 and FIG. 5, the image capture module 220 intermittently captures the captured images one by one at the first time intervals L according to a time axis T, and sequentially transmits the captured images to the first memory 210. For example, there have been two captured images (that is, a first captured image and a second captured image S1-S2) in the first memory 210.

As shown in a first determination D1 in FIG. 5, when the processor 250 compares and determines that no difference exits between the first captured image S1 and the second captured image S2 in the first memory 210, the processor 250 refuses to store the first captured image S1 (as indicated by X mark) in the non-volatile memory unit 240. At this time, the second captured image S2 is still retained in the first memory 210 to serve as "the previous data set" for being compared with the next data set and await a next determination.

Then, after the first time interval L, a third captured image S3 is transmitted to the first memory 210. As shown in a second determination D2, when the processor 250 compares and determines that no difference exits between the second captured image S2 and the third captured image S3 in the first memory 210, the processor 250 also refuses to store the second captured image S2 (as indicated by X mark) in the non-volatile memory unit 240. At this time, the third captured image S3 is still retained in the first memory 210 to serve as "the previous data set" for being compared with the next data set and await a next determination.

Repeatedly, after the first time interval L, a fourth captured image S4 is transmitted to the first memory 210. As shown in a third determination D3, when the processor 250 compares and determines that a difference exits between the third captured image S3 and the fourth captured image S4 in the first memory 210, the processor 250 stores the third captured image S3 (as indicated by √ mark) in the non-volatile memory unit 240. At this time, the fourth captured image S4 is still retained in the first memory 210 to serve as "the previous data set" for being compared with the next data set and await a next determination.

Again, after the first time interval L, a fifth captured image S5 is transmitted to the first memory 210. As shown in a fourth determination D4, when the processor 250 compares and determines that a difference exits between the fourth captured image S4 and the fifth captured image S5 in the first memory 210, the processor 250 stores the fourth captured image S4 (as indicated by √ mark) in the non-volatile memory unit 240. At this time, the fifth captured image S5 is still retained in the first memory 210 to serve as "the previous data set" for being compared with the next data set and await a next determination.

In this manner, as compared with storing four captured images in the non-volatile memory unit 240, only two captured images (that is, the third captured image S3 and the fourth captured image S4) are stored in the non-volatile memory unit 240 in the present embodiment. After an extended time, the number of captured images that are stored is decreased to reduce the storage space occupied.

In addition, although only the third captured image S3 and the fourth captured image S4 are in the non-volatile memory unit 240, users are still able to realize changes represented by the third captured image S3 and the fourth captured image S4 from the third captured image S3 and the fourth captured image S4 to increase the efficiency of finding a specific target from the captured images.

It should be understood that the present embodiment is not limited to comparing two continuous captured images. Those of ordinary skill in the art may change the present embodiment to compare at least two continuous captured images based on the above disclosure.

Additionally, in order to reduce the power consumption and improve the power saving efficiency of the photographing device 201, the sleep module 230 may be utilized to allow the photographing device 201 to sleep during the first time interval L so as to lengthen the service time of the photographing device 201. The present embodiment further comprises the following steps. The processor 250 determines whether no difference exits between each two continuous captured images in a plurality of continuous captured images subsequently captured by the image capture module 220 after a predetermined time. If yes, the processor 250 lengthens the sleep time executed by the sleep module 230, that is, lengthens the first time interval L to a longer second time interval. The image capture module 220 is thus changed to collect captured images of data sets one by one at the second time intervals.

However, from the reality point of view, the present embodiment further comprises the following steps to avoid omitting important information. After the image capture module 220 is changed to collect the captured images of the data sets one by one at the second time intervals, the processor 250 will shorten the sleep time executed by the sleep module 230 if the processor 250 determines that a difference exits between any two continuous captured images in the first memory 210 continuously, that is, shorten the second time interval to a third time interval. The image capture module 220 is thus changed to collect captured images of data sets one by one at the third time intervals. The third time interval is shorter than the second time interval.

Third Embodiment

FIG. 4 depicts a functional block diagram of the photographing device 201 according to a third embodiment of this invention. As shown in FIG. 4, the third embodiment and the second embodiment are about the same. One of the differences is that except for the captured image, each of the data sets further comprises at least one first parameter data. In the third embodiment, the image retaining condition is for determining whether the first parameter data of the data set collected by the photographing device 201 satisfies a preset value. If the first parameter data satisfies the preset value, the image retaining condition is satisfied to store the captured image of at least one of the data sets. Otherwise, the image retaining condition is not satisfied to refuse to store the captured image of at least one of the data sets. To refuse to store the captured image comprises an option of deleting the captured image from the first memory 210 or allowing the captured image not to be stored in the non-volatile memory unit 240.

It should be understood that a type of the first parameter data is not limited in the present embodiment. The first parameter data may be environment brightness, an environment temperature, an environment humidity, an acoustic wave value, GPS (global positioning system) coordinate data, a gravity sensing value, an azimuth value of gyro instrument, a smoke sensing value, or combinations thereof. For example, when the environment temperature is higher than a preset temperature, or, when the smoke sensing value is higher than a preset smoke value, the image retaining condition is satisfied. Otherwise, the image retaining condition is not satisfied. Therefore, the photographing device is ensured to record the images having conservation values when environment or device position changes by way of the image retaining condition in the third embodiment. However, the type of the first parameter data and the preset value correspondingly are not limited according to the present invention. The type of the first parameter data and the corresponding preset value may be adjusted depending on users' requirements or restrictions.

In the third embodiment, in order to facilitate understanding of changes along the time axis T from the captured images in the non-volatile memory unit 240 by users, the processor 250 synthesizes the first parameter data to the captured image belonging to the same data set before storing the captured image in the non-volatile memory unit 240. Hence, users can understand the changes represented by the captured images along the time axis T based on the first parameter data synthesized to the captured images.

The present invention is not limited in this regard. In other embodiments, the processor 250 can respectively record the first parameter data simultaneously generated in a text the before the processor 250 stores the captured image in the non-volatile memory unit 240 so as to reduce load of the processor 250.

Figure 6:
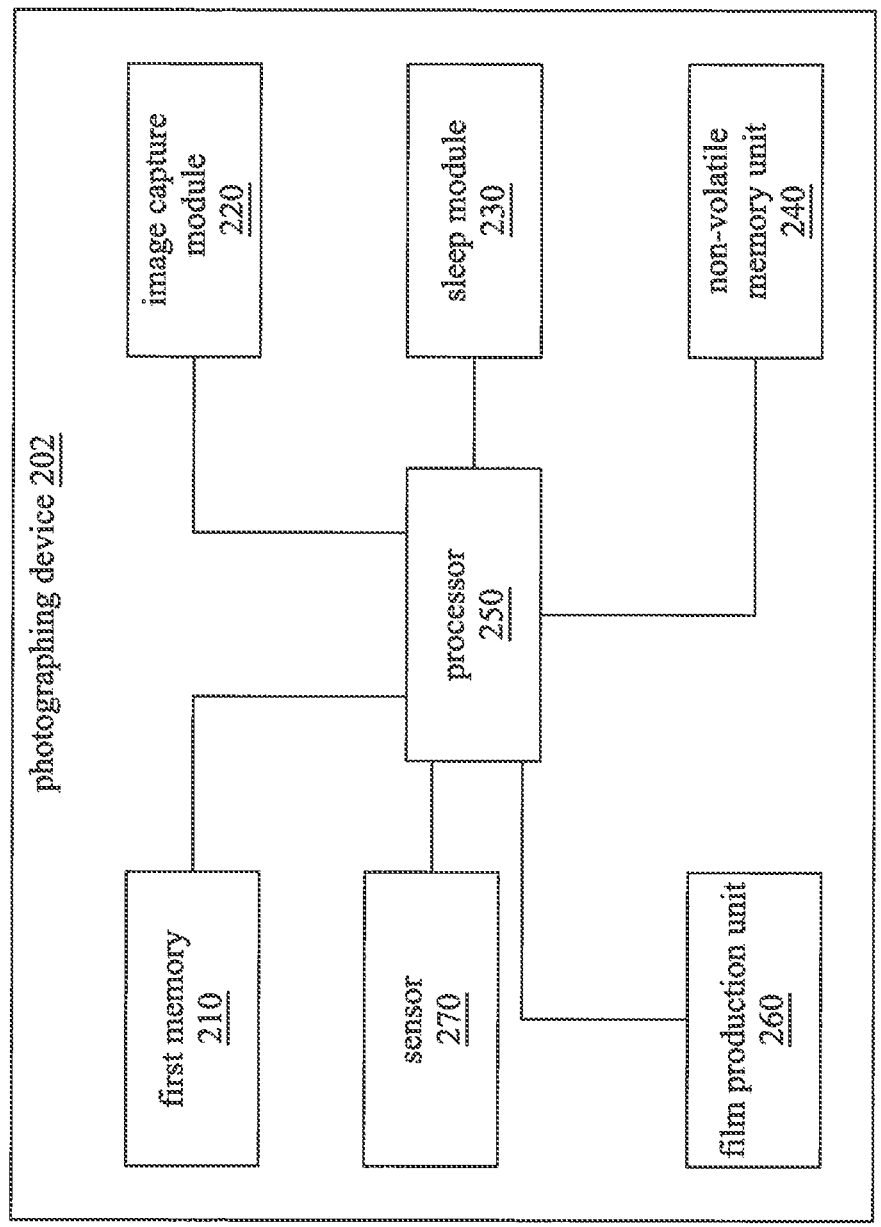
FIG. 6 depicts a functional block diagram of a photographing device according to a third embodiment of this invention.

FIG. 6 depicts a functional block diagram of a photographing device 202 according to the third embodiment of this invention. As shown in FIG. 6, the photographing device 202 of the third embodiment and the photographing device of the second embodiment are about the same. One of the differences is that the photographing device 202 further comprises a sensor 270. The sensor 270 is electrically connected to the first memory 210 and the processor 250. The sensor 270 collects the first parameter data in sequence according to a time axis and transmits the first parameter data to the first memory 210 in sequence. A frequency of collecting the captured images and a frequency of collecting the first parameter data are the same, and the captured images and the first parameter data belonging to the same data set are synchronously collected.

When the processor 250 determines that the first parameter data belonging to the same data set as the current captured image in the first memory 210 satisfies the preset value, the processor 250 stores the captured image in the non-volatile memory unit 240. Otherwise, refuse to store the captured image in the non-volatile memory unit 240. To refuse to store the captured image comprises an option of deleting the captured image from the first memory 210 or allowing the captured image not to be stored in the non-volatile memory unit 240.

It should be understood that a type of the sensor is not limited according to the present embodiment. The sensor may be, for example, a brightness sensing unit, a thermometer unit, a hygrometer unit, an acoustic wave sensing unit, a GPS unit, a gravity sensing unit, a gyro instrument, or a smoke sensing unit. The first parameter data may be the environment brightness collected by the brightness sensing unit, the environment temperature collected by the thermometer unit, the environment humidity collected by the hygrometer unit, the acoustic wave value collected by the acoustic wave sensing unit, the GPS coordinate data collected by the GPS unit, the gravity sensing value collected by the gravity sensing unit, the azimuth value of a gyro instrument collected by the gyro instrument, the smoke sensing value collected by the smoke sensing unit, or combinations thereof.

In addition, since the sensor 270 may sleep for a period or time (that is, the sleep time) at the same time as the processor 250, that means, the sensor 270 captures the first parameter data of the data sets one by one at the first time intervals.

Fourth Embodiment

Figure 7:
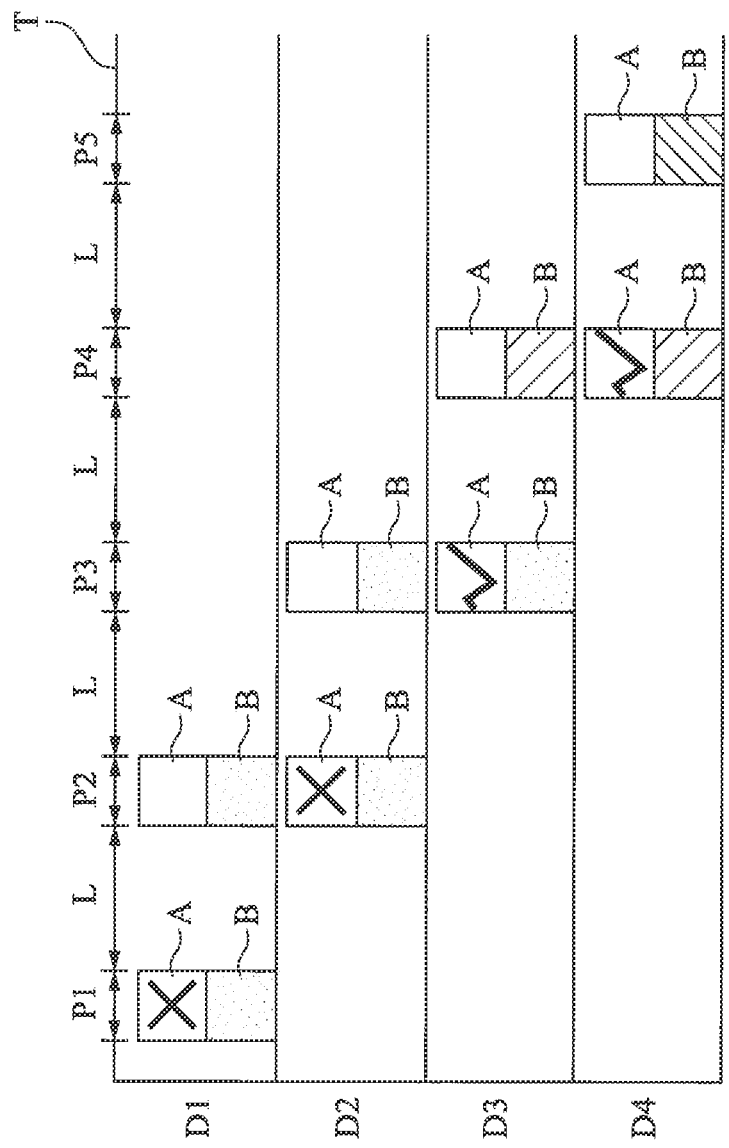
FIG. 7 depicts a time schematic diagram of determinations performed by a photographing device according to a fourth embodiment of this invention.

As shown in FIG. 7, the fourth embodiment and the third embodiment are about the same. One of the differences is that the image retaining condition is for determining whether a difference exits between the first parameter data of at least two continuous data sets collected by the photographing device 202 whenever the photographing device 202 collects the at least two continuous data sets. If it is determined that a difference exits between the first parameter data of the at least two continuous data sets collected, store the captured image of at least one of the at least two continuous data sets.

In greater detail, when the processor 250 determines that a difference exits between at least two continuous parameter data in the first memory 210, the processor 250 stores the captured image synchronously captured with at least one of the at least two continuous parameter data in the non-volatile memory unit 240. Additionally, the processor 250 further retains the captured image of a most previous data set in the at least two continuous data sets in the first memory 210 to serve as "the previous data set" for being compared with a next data set.

Otherwise, when the processor 250 determines that no difference exits between the at least two continuous parameter data in the first memory 210, refuse to store the captured image of the most previous data set in the at least two continuous data sets in the non-volatile memory unit 240. Additionally, the processor 250 further retains the captured image of a last data set in the at least two continuous data sets in the first memory 210 to serve as "the previous data set" for being compared with the next data set.

FIG. 7 depicts a time schematic diagram of determinations performed by the photographing device 202 according to the fourth embodiment of this invention. As shown in FIG. 6 and FIG. 7, in greater detail, when the processor 250 determines whether the image retaining condition is satisfied, the processor 250 determines whether a difference exits between at least two continuous first parameter data B in the first memory 210. If yes, the processor 250 allows at least one of captured images A to be stored in the non-volatile memory unit 240, that is, to store the captured image of the most previous data set, or the captured image of the last data set, or the captured images of all the data sets in the non-volatile memory unit 240. Otherwise, the processor 250 does not process the captured image of the most previous data set in the at least two continuous data sets in the first memory 210 so that the captured image is overwritten by subsequent data. Or, the captured image even disappears after the first memory 210 is powered off.

The image capture module 220 intermittently captures the captured images A one by one at the first time intervals L according to the time axis T, and sequentially transmits the captured images A to the first memory 210. Likewise, the sensor 270 intermittently captures the first parameter data B one by one at the first time intervals L according to the time axis T, and sequentially transmits the first parameter data B to the first memory 210. For example, there have been two data sets (P1-P2) in the first memory 210. Each of the data sets (P1-P2) comprises at least one captured image A and at least one first parameter data.

As shown in the first determination D1 in FIG. 7, when the processor 250 compares and determines that no difference exits between the first parameter data B of the first data set P1 and the first parameter data B of the second data set P2 in the first memory 210, the processor 250 refuses to store the first captured image A of the first data set P1 (as indicated by X mark) in the non-volatile memory unit 240. At this time, the captured image A of the second data set P2 is still retained in the first memory 210 to await a next determination.

Then, after the first time interval L, the captured image A and the first parameter data B of a third data set P3 is transmitted to the first memory 210. As shown in the second determination D2 in FIG. 7, when the processor 250 compares and determines that no difference exits between the first parameter data B of the second data set P2 and the first parameter data B of the third data set P3, the processor 250 refuses to store the captured image A of the second data set P2 (as indicated by X mark) in the non-volatile memory unit 240. At this time, the captured image A of the third data set P3 is still retained in the first memory 210 to await a next determination.

Repeatedly, after the first time interval L, the captured image A and the first parameter data B of a fourth data set P4 is transmitted to the first memory 210. As shown in the third determination D3 in FIG. 7, when the processor 250 compares and determines that a difference exits between the first parameter data B of the third data set P3 and the first parameter data B of the fourth data set P4, the processor 250 stores the captured image A of the third data set P3 (as indicated by √ mark) in the non-volatile memory unit 240. At this time, the captured image A of the fourth data set P4 is still retained in the first memory 210 to await a next determination.

Again, after the first time interval L, the captured image A and the first parameter data B of a fifth data set P5 is transmitted to the first memory 210. As shown in the fourth determination D4 in FIG. 7, when the processor 250 compares and determines that a difference exits between the first parameter data B of the fourth data set P4 and the first parameter data B of the fifth data set P5, the processor 250 stores the captured image A of the fourth data set P4 (as indicated by √ mark) in the non-volatile memory unit 240. At this time, the captured image A of the fifth data set P5 is still retained in the first memory 210 to await a next determination.

Hence, as compared with comparing the captured images which is resource-consuming, the present embodiment only compares at least two continuous first parameter data to determine whether the captured images captured at the same time as the first parameter data need to be retained.

In the present embodiment, in order to facilitate understanding of changes along the time axis T from the captured images in the non-volatile memory unit 240 by users, the processor 250 synthesizes the first parameter data to the captured image belonging to the same data set before storing the captured image in the non-volatile memory unit 240. Hence, users can understand the changes represented by the captured images along the time axis T based on the first parameter data synthesized to the captured images.

The present invention is not limited in this regard. In other embodiments, the processor 250 can respectively record the first parameter data simultaneously generated in a text file before the processor 250 stores the captured image in the non-volatile memory unit 240 so as to reduce load of the processor 250.

In addition, in order to reduce the power consumption and improve the power saving efficiency of the photographing device 202, the present embodiment further comprises the following steps. The processor 250 determines whether no difference exits between each two continuous first parameter data in a plurality of continuous first parameter data subsequently captured by the image capture module 220 after a predetermined time. If yes, the processor 250 lengthens the sleep time executed by the sleep module 230, that is, lengthens the first time interval L to a longer second time interval. The image capture module 220 and the sensor 270 are thus changed to collect captured images and first parameter data of data sets one by one at the second time intervals.

However, from the reality point of view, the present embodiment further comprises the following steps to avoid omitting important information. After the image capture module 220 and the sensor 270 are both changed to collect the captured images and the first parameter data of the data sets one by one at the second time intervals, the processor 250 will shorten the sleep time executed by the deep module 230 if the processor 250 determines that a difference exits between any two continuous first parameter data B in the first memory 210 continuously, that is, shorten the second time interval to a third time interval. The image capture module 220 and the sensor 270 are thus changed to collect captured images and first parameter data of data sets one by one at the third time intervals. The third time interval is shorter than the second time interval.

Fifth Embodiment

Figure 8:
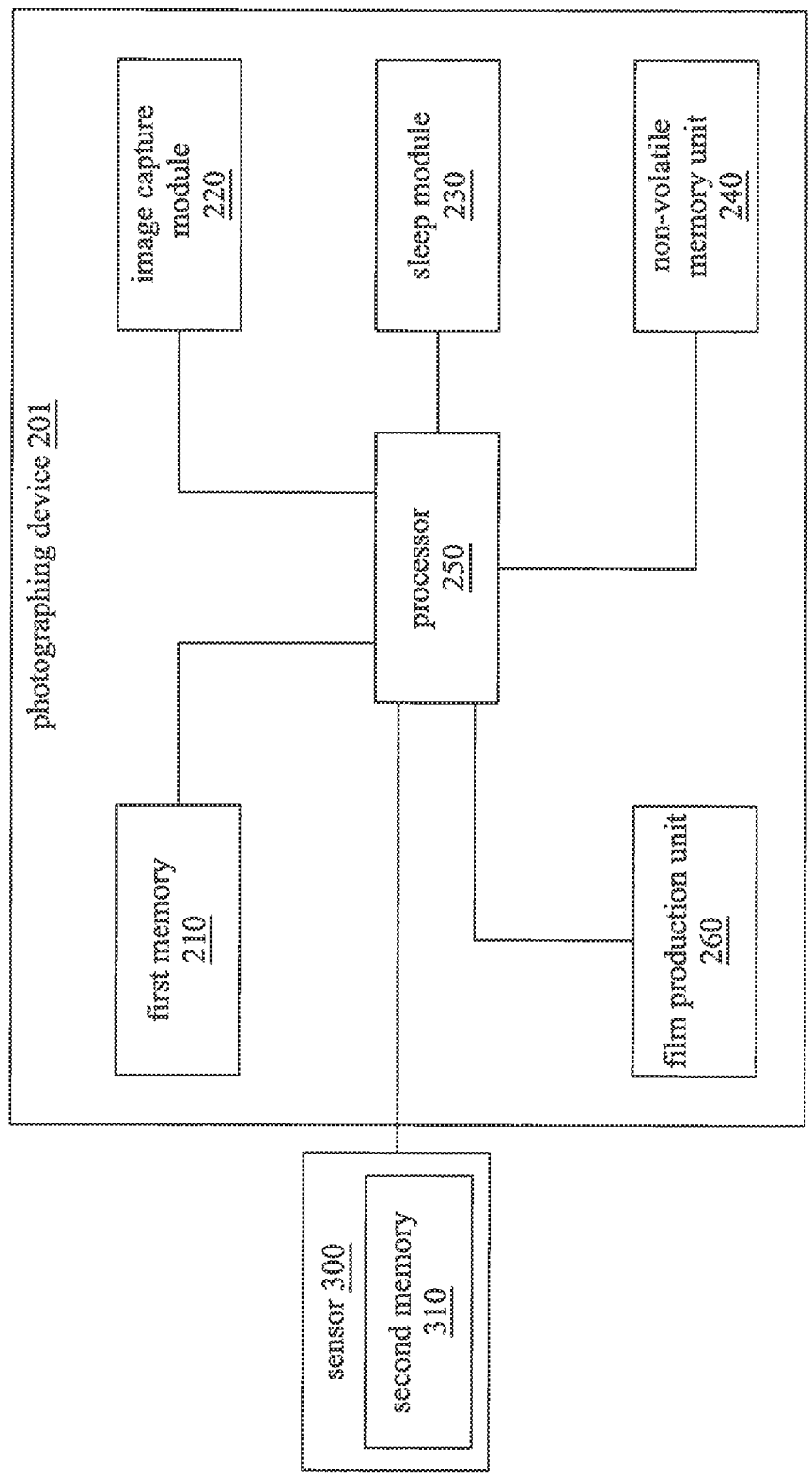
FIG. 8 depicts a functional block diagram of a photographing device according to a fifth embodiment of this invention.
Figure 9:
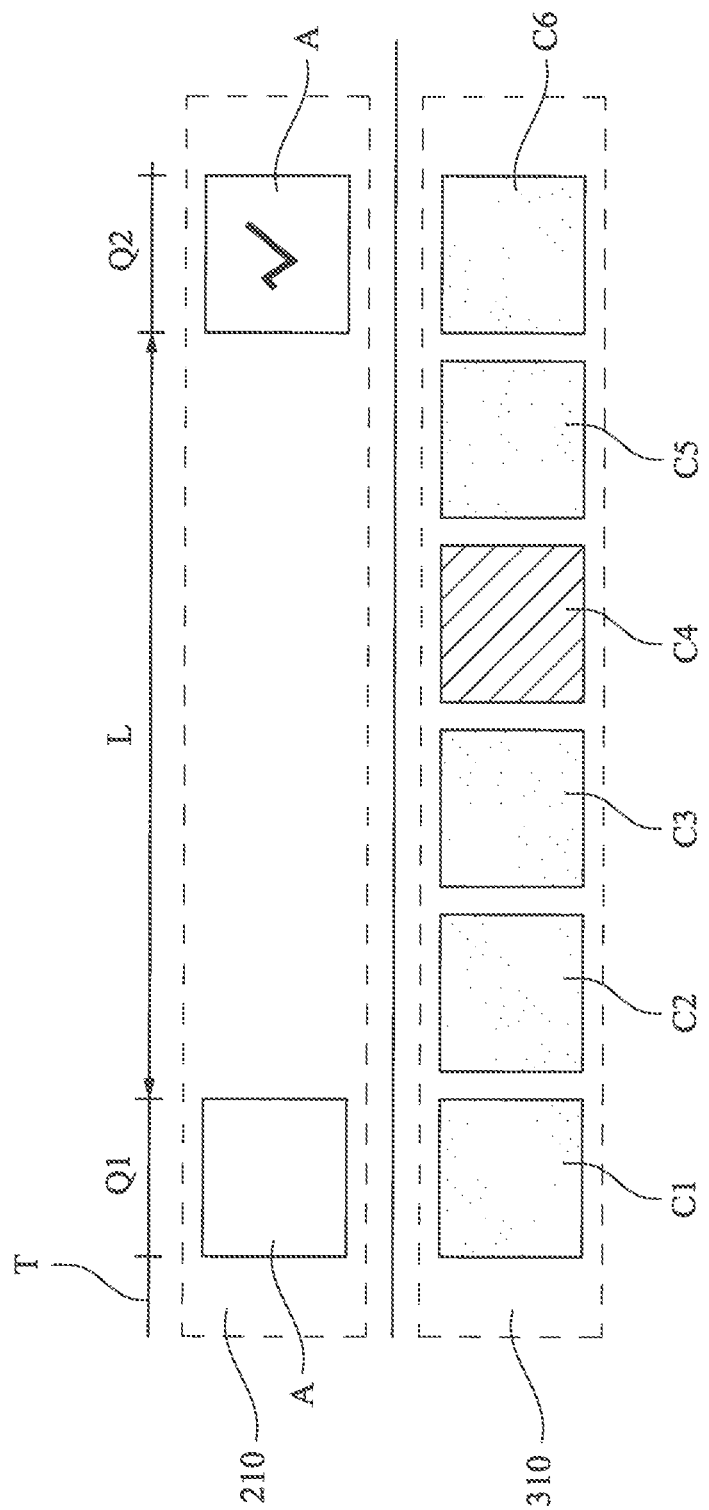
FIG. 9 depicts a time schematic diagram of determinations performed by a photographing device according to the fifth embodiment of this invention.

FIG. 8 depicts a functional block diagram of a photographing device 203 according to a fifth embodiment of this invention. FIG. 9 depicts a time schematic diagram of determinations performed by the photographing device 203 according to the fifth embodiment of this invention. As shown in FIG. 8 and FIG. 9, the fifth embodiment differs from the fourth embodiment in that a sensor 300 is an independent device external from the photographing device 203, and therefore will not synchronously sleep with the processor 250. The sensor 300 has a second memory 310 in it to allow the first parameter data (such as C1 and C6) collected by the sensor 300 to be temporarily stored in the second memory 310 and accessed by the processor 250. Since the sensor 300 according to the fifth embodiment does not sleep at the same time as the processor 250, the sensor 300 still collects a plurality of second parameter data (such as C2-C5) continuously during the first time interval L. In addition, the image retaining condition according to the fifth embodiment is for determining whether a difference exits between the second parameter data (such as C2-C5) continuously collected by the sensor 300 during the first time interval L.

It should be understand that a type of the second parameter data and the type of the first parameter data are the same. The second parameter data and the first parameter data are named only for distinguishing the parameter data collected during/not during the first time interval more clearly. Actually, the second parameter data may be the type of the first parameter data describe in the second embodiment.

As shown in FIG. 8 and FIG. 9, in the fifth embodiment, when the processor 250 determines whether the image retaining condition is satisfied, the processor 250 determines whether a difference exits between the second parameter data (such as C2-C5) continuously collected by the sensor 300 during the first time interval L. In other words, the processor 250 determines whether a difference exits between any of the two second parameter data (such as C2-C5) in the second memory 310 after the processor 250 wakes up. If yes, the processor 250 allows a last one of the captured images A in the first memory 210 (as indicated by √ mark) to be stored in the non-volatile memory unit 240. Additionally, the processor 250 further retains the last one of the captured images A (as indicated by √ mark) in the first memory 210 to serve as "a previous data set" for being compared with a next data set.

Otherwise, not shown in the figures, the processor 250 does not process the captured image of a most previous data set in two continuous data sets in the first memory 210 to allow the captured image to be overwritten by subsequent data. Or, the captured image even disappears after the first memory 210 is powered off. In addition, the processor 250 further retains the captured image of the most previous data set in the two continuous data sets in the first memory 210 to serve as "the previous data set" for being compared with the next data set.

In this manner, the determination as to whether the captured image needs to be retained can be made earlier during the first time interval according to the fifth embodiment without waiting for the comparison between the first parameter data the next time. As a result, an accurate timing for photographing the image is effectively provided.

Except for only determining whether a difference exits between the second parameter data (such as C2-C5) continuously collected by the sensor 300 during the first time interval L, in greater detail, one variation of the fifth embodiment further comprises determining whether a difference exits between the first parameter data B of the most previous data set Q1 in the two continuous data sets Q1, Q2 and any of the second parameter data (such as any of C2-C5) when the processor 250 determines whether the image retaining condition is satisfied. After the processor 250 wakes up and determines that a difference exits between the first parameter data B of the most previous data set Q1 in the two continuous data sets Q1, Q2 and any of the second parameter data (such as any of C2-C5), the processor 250 allows the last one of the captured images A (as indicated by √ mark) to be stored in the non-volatile memory unit 240. Otherwise, not shown in the figures, the processor 250 does not process the captured image A of the most previous data set Q1 in the two continuous data sets Q1, Q2 in the first memory 210 to allow the captured image A to be overwritten by subsequent data. Or, the captured image A even disappears after the first memory 210 is powered off.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A time-lapse photography method comprising:
   determining whether an image retaining condition is satisfied whenever an electronic device with an image-capturing function collects at least two continuous data sets, each of the data sets comprising at least one captured image, wherein determining whether the image retaining condition is satisfied comprises: determining whether a difference exits between the captured images of the at least two continuous data sets;
   storing the captured image of at least one of the at least two continuous data sets when the difference exists between the captured images of the at least two continuous data sets; and
   refusing to store the captured image of at least one of the at least two continuous data sets when no difference exists between the captured images of the at least two continuous data sets.

2. The time-lapse photography method of claim 1, wherein the captured image of a most previous data set in the at least two continuous data sets is stored when the difference exists between the captured images of the at least two continuous data sets collected by the electronic device.

3. The time-lapse photography method of claim 1, further comprising:
   retaining one of the at least two continuous data sets to serve as a previous data set of a next data set when no difference exists between the captured images of the at least two continuous data sets collected by the electronic device.

4. The time-lapse photography method of claim 3, wherein a last data set of the at least two continuous data sets is retained to serve as the previous data set of the next data set when no difference exists between the captured images of the at least two continuous data sets collected by the electronic device.

5. The time-lapse photography method of claim 1, wherein when the electronic device collects the at least two continuous data sets, the electronic device collects at least one data set in the at least two continuous data sets subsequent to a most previous data set at a first time interval, and the first time interval is longer than or equal to one second.

6. The time-lapse photography method of claim 5, further comprising:
   determining whether no difference exists between each two continuous captured images in a plurality of captured images subsequently collected by the electronic device after a predetermined time when the image retaining condition is not satisfied; and
   changing the electronic device to collect data sets one by one at second time intervals if no difference exists between the each two continuous captured images in the plurality of captured images subsequently collected by the electronic device after the predetermined time, wherein the second time interval is longer than the first time interval.

7. The time-lapse photography method of claim 6, further comprising:
   determining whether a difference exits between any two continuous captured images continuously after the electronic device is changed to collect the captured images of the data sets one by one at the second time intervals; and
   changing the electronic device to collect captured images of data sets one by one at third time intervals if a difference exits between the any two continuous captured images, wherein the third time interval is shorter than the second time interval.

* * * * *